Patented Oct. 23, 1945

2,387,528

UNITED STATES PATENT OFFICE 2,387,528

BASIC ALKALINE EARTH CHROMITO-CHROMATE PIGMENT AND METHOD OF MAKING

Gordon Derby Patterson, Wilmington, Del., and Clifford Kanne Sloan, Thornton, Pa., assignors to E. I. du Pont de Nemours & Company, Wilmington, Del., a corporation of Delaware No Drawing. Application April 28, 1943,
Serial No. 484,884

13 Claims. (Cl. 23—56)

This invention relates to novel pigment substances and their manufacture. More particularly it pertains to the preparation of novel basic alkaline earth metal chromates which are highly useful as metal protective pigments.

Metal protective pigments have found extensive use in the priming coat of organic film-forming compositions applied to the surface of metal objects. Such pigments have been effective, at least in part, because of a specific inhibiting or passivating action at the surface of the metal. Among the useful pigments in this field are red lead and certain chromium-containing pigments.

Up to the present time, no fully acceptable priming pigment has been available to the art and the different products have been characterized by more or less undesirable properties which have served as deterrents to their use. Included among such deterrents are paint instability (such as hard caking and livering), chalking, blistering and ineffective inhibitive power.

Of the chromium-containing pigments previously suggested for use in this general field, only zinc yellow has been exploited to any considerable extent. Its use, however, has been limited to coating of non-ferrous metal systems and its employment in general maintenance painting of structural steel surfaces has not been well established. Among other chromium-containing pigments suggested for metal protective use is ordinary or normal calcium chromate. It, too, has failed of commercial use, not only because of the deterrents mentioned, but also for the reason that calcium chromate pigments (especially those obtained by precipitation of a solution of potassium bichromate neutralized by addition of sodium carbonate) exhibit poor covering power and long have been considered unsuitable for general use as pigments in the manufacture of paints or protective coverings. (Bearn, Chemistry of Paint, Pigments and Varnishes, 1923, p. 159.)

This invention has as an object the preparation of novel alkaline earth metal chromate pigments, especially basic calcium chromate pigments, characterized by high stability in organic coating composition vehicles and by pronounced inhibitive action in coating composition films adapted to be applied to metallic surfaces to protect them against corrosion. Other objects and advantages will be apparent from the following description of the invention:

These and other objects are attainable in this invention comprising a pigment composition adapted for control of corrosion, containing as an essential pigment ingredient a basic alkaline earth chromito-chromate pigment, obtained by roasting, at elevated temperatures, an intimate mixture of controlled amounts of an alkaline earth chromate and an alkaline earth compound which is heat-decomposable to the oxide, followed by subjection of the resulting dry reaction mass to disintegration to reduce the same to a state of sub-division suitable for use as a pigment, whereby the resulting pigment will inherently possess certain desired ranges and combinations of properties, particularly with respect to hexavalent chromium content, pH and particle size values.

In a more specific and preferred embodiment, the invention comprises obtaining a basic calcium chromito-chromate pigment, the pH value of which is at least 0.2 to 0.35 unit lower than the pH of the free alkaline earth, and the hexavalent chromium content thereof is approximately 70–80% of the total chromium present, with the major portion of its particles being below about 5 microns, a substantial fraction of said particles being as low as from 0.5 to 2 microns, and at least 95–99% thereof passing a 325-mesh screen, by subjecting an intimate mixture of finely-divided, pigment-size calcium chromate and lime (at a ratio below 22/100

$CaO/CaCrO_4$), to controlled roasting treatment, followed by disintegration of the resulting dry reaction mass to a state of pigment sub-division fineness.

In practically adapting the invention, care is observed to insure production of a final product having a certain range and combination of properties, including hexavalent chromium content, pH, water-solubility and particle size, with special attention being given to such critical factors as (1) ratio of reactants, (2) temperature of roasting, and (3) extent of pulverization. In one preferred adaptation, our pigment-useful basic calcium chromate is obtained by mixing normal calcium chromate with a commercial grade of lime, the initial ratio of $CaO/CaCrO_4$ being below 22/100 and preferably between 12/100 and 20/100. This mixture, in either wet or dry state, is then subjected to a short period of grinding treatment to effect suitable reduction of its particle size, the milling treatment being suitably effected in a ball, pebble or other conventional type of mill or disintegrating device. When the desired grinding and homogeneous association of the reactants is effected, the mix is then roasted under controlled conditions and preferably in an oxidizing atmosphere in a conventional furnace (either of the electric or rotary type). The temperatures employed during the roasting preferably range from about 750° C.–1100° C. and the oxidizing agent used comprises oxygen or other gaseous agents, such as air, steam, etc. The extent of the roasting is dependent upon the temperature used, as well as the amount of hexavalent chromium and pH value or other essential attributes which the final product is to exhibit. Normally, temperatures in excess of about 875° C. require but a roasting period of about one hour to promote the desired reaction. If desired, longer roasting periods may be resorted to, depending upon the temperature, reactants, and type of furnace used, and the pigment properties to be developed in the final product. On conclusion of the roasting treatment, the reaction product is cooled and is then disintegrated to pigment particle size, by grinding in conventional disintegrating equipment, such as hammer mills of the "Mikropulverizer" type, or in a ball or pebble mill.

Disintegration of the roasted alkaline earth chromate/oxide decomposition product is essential to the manufacture of the novel pigments of this invention. In the preferred operation, the roasted products respond to passage through a hammer mill of the "Mikropulverizer" type, equipped with a screen opening of 0.020"–0.029". Resort to disintegration treatment, both prior and subsequent to roasting, insures production of a pigment satisfactory in particle size. For ordinary use, it is desirable that at least 95% and preferably at least 99% of the final product pass through a 325-mesh sieve. In general, the bulk of the preferred pigment will be below 5 microns in size, with a substantial fraction thereof being as low as 0.5 to 2.0 microns. If desired, a particle size classification step can be carried on in series with the grinding process to secure the more finely-divided pigment material.

Due to its relatively low cost, excellent color and hiding power characteristics, the product of this invention will be generally useful for all pigment purposes. It is admirably useful as the primer pigment in films of organic coating compositions for the protection of metallic surfaces, particularly those subject to corrosion. Thus, it is especially effective in protecting iron and steel surfaces and non-ferrous metals, including aluminum, zinc, magnesium, and the like. It is also effective as a protective pigment for various alloys, particularly light-weight alloys, such as those of aluminum and magnesium, including those employed in aircraft construction. Hence, use of the pigment in any way in which a pigment can be employed, and more particularly as an inhibitive pigment, is contemplated. Thus, it can be employed as a component of grease, fatty acids and similar compositions for the protection of metallic surfaces against corrosion. It can also be employed without a vehicle as a dry packing material for corrodible objects for transit, if desired.

To a clearer understanding of the invention, the following examples are given. These are illustrative of certain methods in which the preferred embodiment of the invention can be practiced, and are not to be construed as limiting the scope of our invention:

*Example I*

To a slurry of slaked and ground lime containing 400 pounds equivalent CaO is added 2500 lbs. of 77% calcium chloride flake while heating with live steam and making up with water to a final volume of 550 gallons at 100° C. A 35% sodium chromate-water solution containing sodium chromate equivalent to 2660 pounds of $$Na_2Cr_2O_7.2H_2O$$

is heated with live steam to 100° C. while diluting to 1150 gallons. Solutions and slurries are maintained at 100° C. and the chromate-containing solution run into the calcium-containing system, the strike being continued over a period of 15 minutes. Vigorous agitation is maintained throughout the strike and continued for another hour over an aging period during which temperature is also maintained at 100° C. The yellow precipitated slurry mixture is filter pressed and washed with hot water (90° C. to 100° C.) until free from chlorides, approximately 5000 gallons of water being required. The press cakes are dried in an atmospheric tray drier at 65° C. to 90° C. The dry yellow press cake is charged into a rotary furnace preheated by internal firing with fuel oil. The furnace is 10 ft. in length, 8 ft. internal diameter and rotates once each minute. The furnace is equipped with thermocouples at both ends, permitting control of temperature during the roast. With the charge in the furnace, the temperature is held one hour at such a point that the thermocouple reading at the front or combustion end is 925° C. and 875° C. at the exit end. The combustion gases are held on the oxidizing side. The roasted product is discharged from the furnace, cooled, and disintegrated by passing through a "Mikropulverizer" equipped with a screen having openings of 0.020 inch. The yield is 2800 pounds of an excellent dark-green pigment which is useful in preparation of paints having excellent metal protective value, color, and drying properties.

*Example II*

Two thousand parts of calcium chromate is added to a ball mill containing 1800 parts of water. Three hundred twenty parts of lump lime is slowly added at a rate sufficiently slow to avoid danger in its slaking. The mixture is ground 3 hours to secure intimate mixture. The material is removed from the mill, dried at 100° C. and roasted one hour at 900° C. The roasted material in the form of dark-green lumps is disintegrated to pigment form by passing through a Mikropulverizer equipped with an 0.029 inch screen. X-ray examination of the resultant pigment by the powder method indicates that normal calcium chromate is no longer the predominating component of the roasted material. Such X-ray examination of the material fails to detect the presence of lime. When exposed in organic film-forming compositions, the pigment exhibited superior performance to calcium chromate in such respects as metal protective action, color (especially color stability), rate of drying, and resistance to leaching by water.

Example III

One hundred parts of calcium chromate in powder form is intimately mixed with 20 parts of pulverized lime (calculated as CaO) and the yellow mixture heated in an air atmosphere for one hour at 950° C. The resultant green material is disintegrated to pigment form. A similar pigment made using half the quantity of lime is also green in color but not as dark as the pigment prepared with 20 parts of lime. The green pigments are superior to the original calcium chromate especially in respect to color stability and metal corrosion inhibition when incorporated in organic film-forming compositions. Films containing these green pigments are not as subject to leaching as compared with yellow normal calcium chromate when exposed as a paint film to the weather. Determinations of the rate of solution in water show that the hexavalent chromium is not leached out of the green pigments as rapidly as it is out of the ordinary yellow normal calcium chromate. The rate of solution of hexavalent chromium dissolved from these pigments is shown by the following data, obtained by slurrying 1.00 gram of the pigment in 50 cc. of distilled water and testing the filtrate for total dissolved hexavalent chromium. Data on the pH values of the pigments are also included.

| Pigment | Amount of hexavalent chromium dissolved (calculated as weight of $CrO_3$) | | pH of aqueous slurry |
|---|---|---|---|
| | After 1 hour | After 24 hours | |
| | Grams | Grams | |
| Ordinary yellow normal calcium chromate | 0.045 | 0.222 | 9.6 |
| Light-green pigment prepared from roasts of 100 parts of calcium chromate with 10 parts of lime | 0.015 | 0.080 | 11.3 |
| Dark-green pigment prepared from roasts of 100 parts of calcium chromate with 20 parts of lime | 0.011 | 0.111 | 11.8 |

The following table shows the comparative amounts of hexavalent chromium leached out of paint films in which the pigment is normal calcium chromate on the one hand and a basic calcium chromito-chromate, as prepared in this example, on the other hand. In these tests, 2" x 4" metal panels were coated with films of 2 mils thickness using the same pigment/volume relation. After drying, the panels were immersed half way in equal volumes of water for a week at room temperature and the amount of hexavalent chromium leached from the films was determined by standard titration methods and the results expressed in terms of grams of $CrO_3$. The table shows the results with three different paint vehicles, namely, an alkyd resin, linseed oil and a phenolic resin.

| | Grams $CrO_3$ leached out | | |
|---|---|---|---|
| | Alkyd resin | Linseed oil | Phenolic resin |
| Normal calcium chromate | 0.078 | 0.019 | 0.079 |
| Basic calcium chromite-chromate | 0.0115 | 0.0078 | 0.015 |

Example IV

Green pigments are prepared from barium chromate and barium oxide by wet grinding 250 parts of ordinary yellow normal barium chromate with 40 parts of barium oxide, drying the mixture, roasting in air at a high temperature, cooling, and disintegrating. The properties of such pigments prepared by roasting at 950° C. and at 1100° C. include:

| | Roast at 950° C. | Roast at 1100° C. |
|---|---|---|
| Hexavalent chromium content (calculated as $CrO_3$) percent | 32.2 | 32.6 |
| Nitric acid-insoluble residue from 1.00 gram of pigment grams | 0.185 | 0.225 |
| pH without boiling | 11.10 | 11.15 |
| pH after boiling | 8.70 | 9.0 |

These pigments are effective inhibitors of corrosion when incorporated in organic film-forming coating compositions applied over metal surfaces.

Example V

Green pigments are prepared from strontium compounds using the method of Example IV, except that the corresponding equivalent amounts of strontium chromate and strontium oxide are employed instead of the corresponding barium compounds. The properties of the basic strontium chromito-chromate pigments include:

| | Roast at 950° C. | Roast at 1100° C. |
|---|---|---|
| Hexavalent chromium content (calculated as $CrO_3$) percent | 43.4 | 45.5 |
| Nitric acid-insoluble residue from 1.00 gram of pigment grams | 0.00 | 0.00 |
| pH without boiling | 11.35 | 11.05 |
| pH after boiling | 9.65 | 9.40 |

Although the invention has been described as applied particularly to the preparation of the preferred basic calcium chromate pigments, it is also adaptable to the manufacture of other basic alkaline earth metal chromate pigments, including those of barium and strontium. Likewise, it is not to be construed as limited to the reactants, ratios, temperatures, compounds or grinding methods mentioned, nor to the pH, hexavalent chromium content or other pigment values specified in the examples.

In practicing the invention, most grades of calcium chromate, including that produced by precipitation on reaction of an alkali metal (sodium, potassium) chromate or bichromate with a calcium salt, such as the chloride, nitrate, sulfate or the like, can be used. Both hydrous and anhydrous grades of the normal calcium chromate can be used since the material is calcined during processing. Calcium bichromate can also be used, provided the amount of lime employed is suitably adjusted to take care of the extra acidity. Conveniently the material used is calculated on the basis of its calcium chromate equivalent. Similarly, like standard grades of normal barium and strontium chromates can be employed when preparation is desired of basic alkaline earth metal chromate pigments of their type. As shown in Example I, it is not necessary to isolate the alkaline earth chromate. It may be prepared in situ, for example, from sodium chromate and calcium chloride, or from lime and chromic acid, either wet or dry, and the primary reaction product handled with additional lime to supply the mixture to be converted to a pigment.

As the calcium oxide component of the reaction in the production of the preferred calcium chromate pigment, commercial grades of lime ordinarily are suitable for use. Air-slaked lime, water-slaked lime, and limestone are also useful. Other calcium compounds, particularly those heat-decomposable to the oxide at the temperatures employed (hydroxide, carbonate or other salts of calcium) can be used; and the amount of calcium compound so employed is conveniently calculated in terms of CaO content. It is necessary that the calcium oxide component of the reaction be finely pulverized, either before or after the intimate mixing with the calcium chromate compound, in order that a complete reaction will be had on roasting, leaving no local centers of free alkaline material.

In the production of other alkaline earth metal chromates, commercial grades of barium oxide and strontium oxide can be conveniently used. Other barium or strontium compounds and salts similar to those mentioned in respect to calcium salts and which are heat-decomposable to the oxide in the presence of the chromate at the temperature employed, can also be used. Similarly, the amounts used are conveniently calculated on the basis of the barium or strontium oxide content.

Intimate mixing of the alkaline earth chromate and oxide material can be effected in many ways. The examples illustrate convenient types of such methods as (1) dry mixing, (2) wet ball milling, and (3) addition of a slurry of the oxide to one of the component aqueous solutions prior to striking the alkaline earth chromate precipitate. Other methods, including blending of the oxide and chromate slurries prior to filtration and drying, can also be used. In the wet blending operation, it is important that resort be had to thorough agitation in order to prevent segregation of the components of the mixture by sedimentation.

As stated, the successful practice of the invention requires that control be exercised over other steps in processing, including (1) ratio of lime (or other alkaline earth metal oxide or base) to the calcium, barium or strontium chromate, (2) temperature of roasting, and (3) disintegration of the roasted reaction product to a state suitable for pigment use. While a green material can be obtained rather generally by heating mixtures of lime and calcium chromate at elevated temperatures, only those compositions prepared under the controlled conditions of this invention are suitable for use as pigments. For example, if the initial $CaO/CaCrO_4$ ratio is greater than about 22/100, the final product will be undesirably low in $Cr^{+6}$/total Cr ratio (i. e., lower than 70%), will be on the bluish gray side of green, will be less efficient in covering power and will afford poor, low gloss films on drying of the coating composition. Additionally, coating compositions containing such products will be slow drying in character. For desired performance on outdoor exposure, therefore, and especially for exposure in films for protecting metal surfaces, we have found it highly desirable to keep substantially below said 22/100 $CaO/CaCrO_4$ ratio and above a 5/100 $CaO/CaCrO_4$ ratio. A preferred ratio range comprises from between 12/100 to 20/100 $CaO/CaCrO_4$, with a ratio of 16/100 to 18/100 being useful for providing an optimum type of product, as shown in Example I. Using these ratios, the hexavalent chromium content is approximately 70–80% of the total chromium content, indicating decompistion of between ⅓ and ⅕ of the chromium from the chromate to the chromite form. At $CaO/CaCrO_4$ ratios lower than about 12/100 the percentage of chromium reduced to chromite is less than 20%, whereas at higher ratios than 22/100, the reduction of chromium takes place to an extent greater than 30%. Outside of the indicated preferred ratio range, the products with the lower $CaO/CaCrO_4$ ratios have greater utility than those with higher ratios, although the principal benefits of the invention are not fully realized when, as noted, an initial $CaO/CaCrO_4$ ratio below about 5/100 (at which point the product of roasting contains about 95% of the chromium in hexavalent form) is employed. For the preferred range, the absolute hexavalent chromium content is 48% to 38.1% (expressed as %$CrO_3$) corresponding to the initial $CaO/CaCrO_4$ ratios of 12/100 and 20/100, respectively.

The following table shows the actual hexavalent chromium content and corresponding pH value of several pigments prepared by roasting at several $CaO/CaCrO_4$ ratios, all roasts having been conducted for a period of one hour at 950° C.:

| Initial $CaO/CaCrO_4$ ratio | Hexavalent chromium content (percent $CrO_3$) | pH value |
| --- | --- | --- |
|  | Percent |  |
| 1/100 | 62.5 | 10.3 |
| 6/100 | 56.0 | 10.8 |
| 9/100 | 51.2 | 10.9 |
| 12/100 | 47.7 | 11.1 |
| 14.4/100 | 43.5 | 11.2 |
| 17.9/100 | 40.0 | 11.4 |
| 20.5/100 | 38.6 | 11.5 |
| 72/100 | 24.4 | 12.1 |
| 144/100 | 16.4 | 12.2 |

The green color of pigments prepared in accordance with the invention increases steadily with an increase in $CaO/CaCrO_4$ ratio from 5/100 to 22/100, being light-yellow green at the lower lime ratio and dark-green at the higher ratio. The pigment covering power also increases steadily to this same 22/100 ratio point. Outside these ratios, however, the pigments have less intense hiding power, are less saturated in color (being more bluish-gray in cast above said 22/100 ratio), have less satisfactory drying and durability characteristics, and therefore are unsatisfactory for use as metal protective pigments.

It is also important that the pigment product have a pH value definitely below that of the free alkaline earth, as determined by slurrying 1 gram of pigment in 50 cc. of water and testing with a glass electrode. Under such conditions, free lime and free lime-containing pigments show a pH value in the range of from 12.0 to 12.3. Preferably, the pigments should have a pH at least 0.2 to 0.35 unit lower than this, because such forms of product afford optimum benefits and results. Where a calcium pigment is being prepared, it is well to adjust the processing conditions so as to insure that a pH of not greater than 11.8, and preferably of the order of 11.4 to 11.5 or less, prevails when the slurry is tested as above outlined. The pH of these pigments, in any case, will be above that of the corresponding normal alkaline earth chromate. In the case of calcium chromate, this value is 8.9. In the cases of barium chromate and strontium chromate, values of approximately 8.0 and 8.4, respectively, result, taking into account the difficulty of determining the pH of such relatively insoluble materials.

The temperature of roasting is also important, and, while variable, must be controlled in successfully practicing the invention. The pigment color, covering power, hexavalent chromium content, pH, and degree of sintering on roasting are included among the properties affected by the roasting temperature used. Depth of color development is greatly affected by higher temperatures and, in general, with a low $CaO/CaCrO_4$ ratio of 4.5/100, practically no color change occurs at a temperature of 600° C. From 700° C. to 1000° C., however, a gradual change occurs to medium green, while at 1100° C. a more pronounced change takes place. At a higher $CaO/CaCrO_4$ ratio, say, at a 14.4/100 ratio, color development takes place at a much lower temperature and is as far advanced at 700° C. as at 1100° C. with the 4.5/100 ratio. Darker but clean greens are obtained upon roasting a 14.4/100 ratio at 800° C. and 900° C. At 950° C., the pigment becomes very dark, bordering on the black, while at higher temperatures, using the same ratio, the pigments lose their brilliance somewhat. Reaction at the low temperatures is incomplete, being evidenced by the low chromate decomposition, low color development and higher pH. Reaction at lower temperatures is greater at the higher $CaO/CaCrO_4$ ratios but even at the 14.4/100 ratio reaction is incomplete at 650° C., as indicated by the chromate content and pH values. Above 750° C. to 800° C., chromate decomposition is relatively constant for a given $CaO/CaCrO_4$ ratio, at least as high as 1150° C. However, higher roasting temperatures, though employable, are not preferred, because of the increased, undesired sintering which occurs and the consequent necessity of prolonging the subsequent grinding treatment to eliminate resulting aggregates. In general, therefore, use is preferreed of roasting temperatures of the order of 750° C. or above, while employing a ratio of reactants, expressed in terms of $CaO/CaCrO_4$, of less than 22/100. With a $CaO/CaCrO_4$ ratio of, say, 12/100, a temperature of about 975° C. is preferred. If desired, said preferred 750–975° C. range may be varied, either by increasing the maximum temperature to 1025° C. (while maintaining said $CaO/CaCrO_4$ ratio limits) or the $CaO/CaCrO_4$ ratio limit may be lowered to 1/100, but preferably not lower than 5/100, while maintaining said preferred temperature limits.

Actual fusion occurs when roasting the lower $CaO/CaCrO_4$ ratios, fusion at the different $CaO/CaCrO_4$ ratios beginning at approximately the following temperatures:

| $CaO/CaCrO_4$ ratio | Fusion temperature, °C. |
|---|---|
| 1/100 | 950 |
| 2/100 | 980 |
| 4/100 | 1,000 |
| 6/100 | 1,025 |
| 9/100 | 1,040 |
| 12/100 | 1,100 |

The product of the present invention will exhibit enhanced pigment characteristics and will be greatly improved over pigments consisting of ordinary alkaline earth chromates. The improvement is especially marked in the case of its utilization in organic film-forming vehicles for the protection of metal surfaces against corrosion. The unusually high degree of metal protection value is unexpected from the standpoint of the relatively low chromate content as compared to the normal prior art pigments. It is also superior from the standpoint of color, rate of drying, color stability and resistance to leaching. Additionally, economy can often be practiced by utilizing certain impure grades of normal alkaline earth chromates not suitable for use per se as pigments.

The resulting product of this invention, therefore, is generally useful as a pigment and is particularly useful as the primer pigment in films of organic coating compositions for the protection of metallic surfaces, particularly those materials that are subject to corrosion. Thus, the dry reaction product pigment is useful in various oleoresinous vehicles including linseed oil, Chinawood oil, oiticica oil, and the like, nitrocellulose and other cellulose derivatives used in coating compositions, chlorinated rubber, alkyd and alkyd-fortified oleoresinous systems, phenol-formaldehyde resins such as Bakelite and the like, Vinylite, vinyl acetate and polyhydric alcohol-mixed esters of drying oil acids and other monofunctional monocarboxylic acids such as beta-furylacrylic acid, delta-2,4-hexadienoic acid, methacrylic acid, alpha-vinylcinnamic acid and the like, and in synthetic resin vehicles generally.

As is the case in the use of other primer pigments, topcoats can be applied over the primer film to increase durability of the system containing the pigment of this invention. An uncoated primer film containing the product of this invention is durable, however. Thus, the film containing it is usually found to be intact and serviceable at a period in exposure when a red lead film is badly chalked and failing by erosion. Conventional black and aluminum topcoats are among the systems satisfactory for application over a film pigmented with the product of this invention.

The cost, color, and hiding characteristics of the chrome ore reaction product pigment make this material suitable for use as the sole pigment of a film-forming composition. In this case, it is desirable to use sufficient material to give a final film containing 30% to 40% by volume of the pigment. If desired, the pigment can be extended with other materials such as are customarily used with prior art primer pigments. Extenders may be used in this manner including iron oxide, ferrite yellow, talc, asbestine, barium or calcium sulfates, and the like. Furthermore, the pigment can be augmented by the addition of other well-known prior art pigments, such as red lead, zinc yellow, calcium chromate, etc. If desired, dispersion control agents of the polar type, including materials of anionic and cationic characteristics contemplated in the copending application Ser. No. 484,883, filed April 28, 1943 of C. K. Sloan, can be added to the pigment of this invention to modify dispersion control properties such as can stability, degree of hard caking, application, water-repellancy or sensitivity, and the like. Also, our novel pigments can be advantageously treated with the phosphate-modifying agents set forth in the co-pending application of C. K. Sloan, Ser. No. 484,879, filed April 28, 1943.

We claim as our invention:

1. A process for preparing a basic alkaline earth chromito-chromate pigment which comprises subjecting a finely-divided, intimate mixture of controlled amounts of an alkaline earth chromate and an alkaline earth compound which is heat-decomposable to the oxide, to roasting treatment at temperatures ranging from about 700° C. to about 1200° C., and disintegrating the resulting reaction product to a pigment particle size state of sub-division whereby at least 95% of the final product passes 325 mesh.

2. A process for preparing a basic alkaline earth chromito-chromate pigment which comprises subjecting a finely-divided, intimate mixture, in a ratio ranging from 5/100 to not exceeding 22/100, of an alkaline earth compound heat decomposable to the oxide and an alkaline earth chromate to roasting treatment at temperatures ranging from about 700° C. to about 1150° C., and then disintegrating the dry reaction product to a pigment particle size state of sub-division whereby at least 95% of the final product passes 325 mesh.

3. A process for preparing a basic calcium chromito-chromate pigment comprising subjecting a previously-ground, finely-divided, intimate mixture of calcium oxide and calcium chromate, in the ratio of 6/100 to 22/100 to roasting treatment for a period of about one hour, at a temperature ranging from about 750° C. to about 975° C., and then disintegrating the dry reaction mass which results to a state of pigment fineness whereby at least 95% of the final product passes 325 mesh.

4. A process for preparing a basic calcium chromito-chromate which comprises subjecting a previously ground, finely-divided, intimate mixture of calcium oxide and calcium chromate in the ratio of 12/100 to 20/100 to roasting treatment at a temperature ranging from about 750° C. to about 975° C., and then disintegrating the dry reaction product to a state of pigment particle size sub-division whereby at least 99% of the final product passes 325 mesh.

5. A process for preparing a basic barium chromito-chromate which comprises subjecting a finely-divided, intimate mixture of barium oxide and barium chromate in the ratio of 12/100 to 20/100 to roasting treatment at a temperature ranging from about 750° C. to about 975° C., and then disintegrating the dry reaction product to a state of sub-division whereby at least 99% of the final product will pass 325 mesh.

6. A process for preparing a basic strontium chromito-chromate which comprises subjecting a finely-divided, intimate mixture of strontium oxide and strontium chromate in the ratio of 12/100 to 20/100 to roasting treatment at a temperature ranging from about 750° C. to about 975° C., and then disintegrating the dry reaction product to a state of sub-division whereby at least 99% of the final product will pass 325 mesh.

7. A basic alkaline earth chromito-chromate pigment comprising the calcined, disintegrated reaction product of an intimate mixture of an alkaline earth chromate and an alkaline earth compound heat-decomposable to the oxide, said pigment having a pH value in the range between the pH of the normal chromate of the involved alkaline earth and a pH value about 0.2 to 0.35 pH unit below that of the free alkaline earth oxide concerned, said pigment also being characterized in that at least 95% of its particles pass 325 mesh, from about 70 to 95% of its chromium content is in the hexavalent form and from about 5% to about 30% is in the trivalent state.

8. A basic alkaline earth chromito-chromate pigment comprising the pulverized reaction product of a calcined mixture of an alkaline earth chromate and an alkaline earth compound heat-decomposable to the oxide, the alkaline earth oxide to chromate in said mixture not exceeding the ratio of 22/100, said pigment having a pH value in the range between the pH of the normal chromate of the alkaline earth chromate involved and a pH value about 0.2 to 0.35 pH unit below that of the free alkaline earth oxide concerned, said pigment also being characterized in that at least 95% of its particles pass 325 mesh, from about 70% to about 85% of its total chromium content is in the hexavalent form, while from about 15% to about 30% thereof is in the trivalent state.

9. A basic alkaline earth chromito-chromate pigment comprising the pulverized reaction product of a calcined mixture of an alkaline earth chromate and an alkaline earth compound heat-decomposable to the oxide, the alkaline earth oxide to chromate in said mixture being in the ratio which ranges from about 12/100 to 20/100, said pigment having a pH value in the range between the pH of the normal chromate of the alkaline earth chromate involved and a pH value about 0.2 to 0.35 pH unit below that of the free alkaline earth oxide concerned, said pigment also being characterized in that at least 95% of its particles pass 325 mesh, from about 70% to about 85% of its total chromium content is in the hexavalent form, while from about 15% to about 30% thereof is in the trivalent state.

10. A basic calcium chromito-chromate pigment comprising the disintegrated reaction product of a calcined mixture of calcium oxide and calcium chromate, the ratio of oxide to chromate in said mixture ranging from about 12/100 to 20/100, said pigment having a pH value in the range above that of normal calcium chromate and a pH value about 0.35 pH unit below that of free calcium oxide, and being further characterized in that at least 99% of its particles pass 325 mesh, and from about 70% to about 85% of its total chromium content is in the hexavalent state.

11. A basic calcium chromito-chromate pigment comprising the disintegrated reaction product of a calcined mixture of calcium oxide and calcium chromate, the ratio of oxide to chromate in said mixture ranging from about 12/100 to 20/100, said pigment having a pH value ranging from about 10.7 to about 11.8, with from about 70% to about 85% of its total chromium content in the hexavalent condition, calculated as $CrO_3$, and at least 99% of its particles pass 325 mesh.

12. A basic barium chromito-chromate pigment comprising the disintegrated reaction product of a calcined mixture of barium oxide and barium chromate, the ratio of oxide to chromate in said mixture ranging from about 12/100 to 20/100, said pigment having a pH value ranging from about 10.7 to about 11.8, with from about 70% to about 85% of its total chromium content in the hexavalent condition, calculated as $CrO_3$, and at least 99% of its particles pass 325 mesh.

13. A basic strontium chromito-chromate pigment comprising the disintegrated reaction product of a calcined mixture of strontium oxide and strontium chromate, the ratio of oxide to chromate in said mixture ranging from about 12/100 to 20/100, said pigment having a pH value ranging from about 10.7 to about 11.8, with from about 70% to about 85% of its total chromium content in the hexavalent condition, calculated as $CrO_3$, and at least 99% of its particles pass 325 mesh.

GORDON DERBY PATTERSON.
CLIFFORD KANNE SLOAN.